Feb. 5, 1935.  J. M. CHRISTMAN  1,989,846
MOTOR VEHICLE
Filed Dec. 11, 1931   2 Sheets-Sheet 1
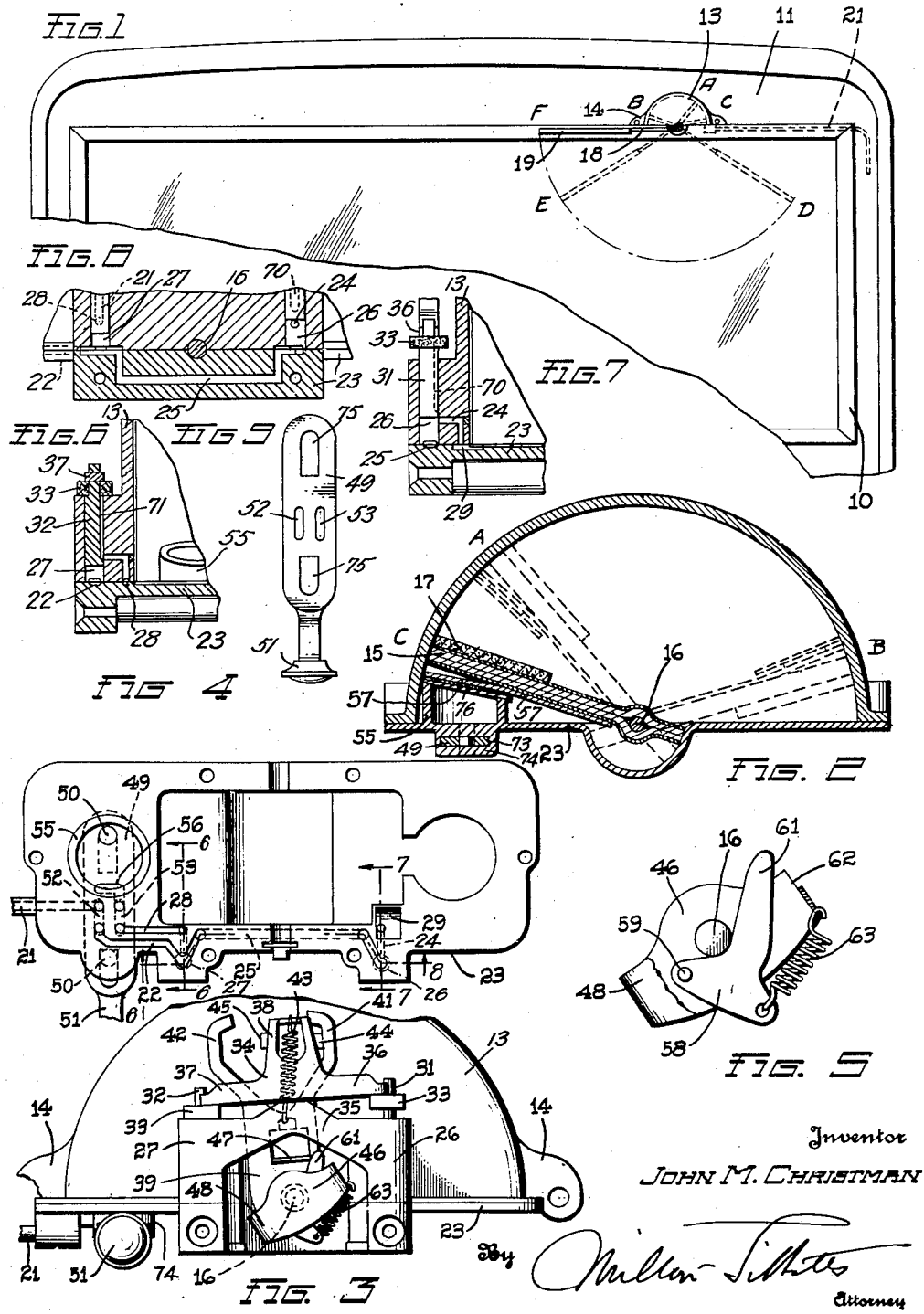
Inventor
JOHN M. CHRISTMAN
By Miller Tillotts
Attorney Inventor
JOHN M. CHRISTMAN
By Milton Titts
Attorney Patented Feb. 5, 1935

1,989,846

UNITED STATES PATENT OFFICE 1,989,846

MOTOR VEHICLE

John M. Christman, Detroit, Mich., assignor to Packard Motor Car Company, Detroit, Mich., a corporation of Michigan Application December 11, 1931, Serial No. 580,374

12 Claims. (Cl. 121—97)

This invention relates to automatically actuated wipers for windshields and the like.

In a windshield cleaner of conventional design, the wiping blade is usually parked at one extreme limit of its wiping movement when the cleaner motor is not in operation. The wiping blade in this position, being within the normal wiping area thereof, rests on the windshield and directly within the driver's range of vision. When the vehicle is traveling at a fast rate of speed and encounters wind resistance, the wiping blade tends to rapidly oscillate within a small area adjacent the parked position. Such movement of the wiping blade is oftentimes very annoying to the driver of the vehicle and even when the wiping blade does not move relative to its normal parked position, the driver's range of vision is somewhat obstructed thereby.

An object of the invention is to provide a windshield cleaner for a motor vehicle in which the wiping blade is automatically parked completely out of the driver's view when not in use.

Another object of the invention is to provide a windshield cleaner for a motor vehicle in which the wiping blade is parked substantially horizontally of the windshield and above the driver's range of vision when not in use.

A further object of the invention is to provide a windshield cleaner for a motor vehicle which will wipe a large area and will park the wiping blade beyond the limits of the normal wiping movement thereof and out of the driver's range of vision.

Other objects and advantages of the invention will become apparent from a reading of the following description taken in connection with the accompanying sheet of drawings, in which:

Fig. 1 is a front elevational view of a portion of a motor vehicle showing the windshield and a portion of the body structure having the windshield cleaner comprising this invention associated therewith.

Fig. 2 is a vertical sectional view of the piston chamber of the cleaner motor.

Fig. 3 is a rear elevational view of the cleaner motor with the rear cover removed and showing a portion of the valves and the valve actuating mechanism.

Fig. 4 is a plan view of the cover plate of the motor casing showing a portion of the piston chamber and the suction passages therein.

Fig. 5 is an elevational view with a portion broken away of part of the valve actuating mechanism comprising this invention.

Fig. 6 is a sectional view taken on line 6—6 of Fig. 4 with the cover plate in assembled position;

Fig. 7 is a sectional view taken on line 7—7 of Fig. 4 with the cover plate in assembled position;

Fig. 8 is a fragmentary sectional view taken on line 8—8 of Fig. 4 with the cover plate in assembled position;

Fig. 9 is a plan view of the plate valve detached from the assembly;

Figure 10:
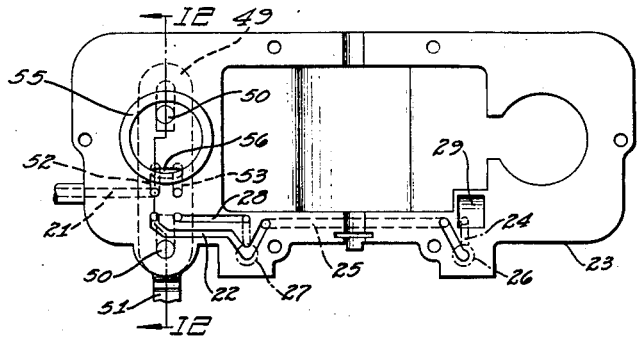
Fig. 10 is a view similar to Fig. 4 with the control valve in position parking the wiper.
Figure 11:
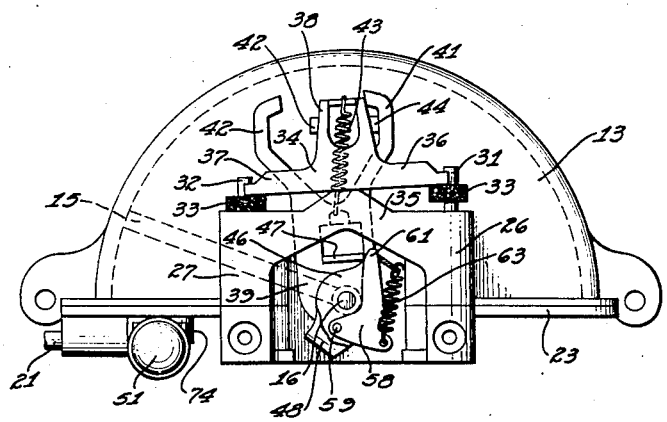
Fig. 11 is a view similar to Fig. 3 showing the position of the actuating mechanism when the wiper is parked.
Figure 12:
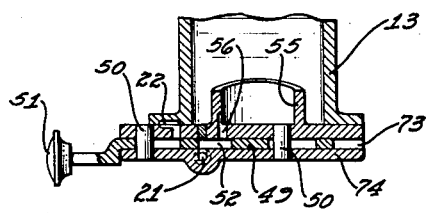
Fig. 12 is a sectional view taken on line 12—12 of Fig. 10.

In accordance with this invention the wiper motor is provided with means which moves the wiper blade over a normal wiping range but which, when inoperative, will park the wiper blade beyond the limits of the wiping area and completely out of the driver's range of vision.

Referring to the drawings, 10 indicates the windshield frame of a motor vehicle and, as shown, comprises parallel vertical side members and horizontally disposed connecting members and is set in the vehicle body frame work in the usual manner. The windshield wiper motor is secured to the forward cross-header 11 of the body frame-work slightly above the windshield glass and on the driver's side of the vehicle and, as shown, comprises a semi-circular casing 13 having flanges 14 for securing it to the cross-header 11 by any suitable means.

A vane piston 15 is mounted in the casing on a rock shaft 16 for oscillatory movement, and may be provided with packing 17 for insuring a tight fit with the walls of the casing. A wiper arm 18 is fixed on an end of the shaft 16 projecting from the casing for oscillatory movement therewith and the wiper arm, at its free end, may be provided with a suitable metal channel member to which a wiping blade 19 of rubber, or other suitable material, is attached in the usual manner. It will be understood that the piston oscillates within the casing to move the wiping blade in an arc over a surface of the windshield.

Suitable pneumatic pressure for operating the vane piston 15 and the wiper is provided by a flexible tube 21 which is connected to the intake manifold of the vehicle motor and to the cleaner motor casing by any suitable means. The suction line 21 may be connected to a suction passage 22, formed in the cover plate 23, and a suction passage 24 is connected to the passage 22 by a passage 25. The passage 22 and the passage 25 are in different planes and are connected by a valve chamber 27 while the passage 24 and the passage 25 are in different planes and are connected by a valve chamber 26. A passage 28 in the cover plate has one end communicating with the chamber 27 and the passage 24 leads into a port 29 which is open to the valve chamber.

Atmospheric pressure is alternately admitted to the faces of the vane piston, and the faces of the vane are alternately placed in communication with the suction passages 22 and 24 by suitable valves and valve actuating mechanism. The valve mechanism comprises valve plugs 31 and 32 located respectively in the valve chambers 26 and 27. The valve plug 31 can be reciprocated to open or close the passage 24 so that it is connected with or disconnected from the passage 25. This valve plug has a peripheral groove 70 extending in an axial direction to establish communication between the passage 24 and atmosphere when the valve plug is in a position closing the passage 24. The valve plug 32 can be reciprocated so that it opens or closes the passage 28 to thereby make or break the connection with the passage 22. This valve plug has a peripheral groove 71 extending in an axial direction to the outer end portion thereof so as to connect the passage 28 with atmosphere when closed off from the passage 22. Each of the valve plugs is provided with a suitable washer 33 which forms a sound deadening pad but which allows sufficient atmospheric pressure to be admitted to one side of the piston through the valve ports when the opposite side thereof is open to suction.

When the valves are in the position shown in Fig. 3 the valve 32 is located so that it cuts off communication between the suction passage 22 and the branch passage 28, and the valve 31 is open, thus establishing communication between the suction passages 22, 25 and 24 with the port 29 whereby suction is admitted to the right side of the vane and the piston will be moved to the right under atmospheric pressure until the positions of the valves are reversed to establish communication between the suction passage 22 and the branch passage 28, closing communication between the passage 25 and the port 29 to cause an opposite oscillatory movement of the vane.

For alternately reversing the position of the valves, a valve actuating rocker 34 is pivotally mounted upon a bridging portion 35 between the valve chambers 26 and 27. This rocker is provided with laterally extending arms 36 and 37 which are respectively seated in recesses in the valve plugs 31 and 32. The rocker arm is provided with an upwardly extending portion 38 presenting contact faces by which the rocker arm is tilted. To alternately tilt the rocker arm, an upwardly extending plate 39 is pivotally mounted on the rocker shaft 16 and has a pair of upwardly and outwardly extending arms or fingers 41 and 42 which alternately contact the upwardly extending portion 38 of the rocker arm. A spring 43 is mounted on the upwardly extending portion 38 of the rocker arm substantially in the center thereof and is secured to the actuating member 39 substantially intermediate the arms 41 and 42 so that when the actuating member 39 is moved past the center, a snap action will be imparted to the rocker arm whereby the valves will be quickly actuated. The casing may be provided with a pair of stops 44 and 45 which limit the movement of the arms 41 and 42. The mechanism for initiating movement of the actuating member 39 to alternate the position of the valves preferably includes a plate 46 mounted on the end of the rocker shaft 16 for oscillating movement therewith and is secured to the shaft by any suitable means. A shoulder 48 on the plate and a finger 61 are adapted to alternately engage a projecting portion 47 on the actuating member 39.

It will be seen that, with the valves in the position shown in Fig. 3, communication will be established between the suction passage 25 and the port 29 through the valve 31 and the chamber 26 whereby suction will be introduced on the right side of the vane piston and the piston will be forced to move to the right under atmospheric pressure thereby oscillating the rocker shaft 16 which carries the plate 46. As the shoulder 48 of the plate 46 contacts the projection 47 of the valve actuating member, this member will move to the right thereby tilting the rocker arm 34 to close the valve 31 and open the valve 32 whereby communication is established between the suction passage 22 and the branch passage 28 and communication is closed between the port 29 and suction passage 25, so that suction is cut off from the right side of the piston and communicated to the left side thereof, allowing the piston to be forced to the left under atmospheric pressure until the valve actuating member 39 is contacted by the finger 61 on the plate 46 to again tilt the rocker arm. The valves will then be positioned as shown in Fig. 3 whereby the piston will again be oscillated to the right. As long as the wiper motor is in operation the valves and the valve actuating mechanism will continue to alternately establish a suction and an atmospheric communication on the sides of the piston whereby the piston vane will be oscillated substantially between the points "A" and "B" as shown in Fig. 2 and the wiper blade 19 will be oscillated in an arc between the points "D" and "E" as seen in Fig. 1. It will be observed that the points "D" and "E" are substantially equidistant from the vertical center line of the casing so that the wiper blade will wipe an equal area of the windshield on each side of such vertical center line.

Suitable control means for the motor are provided and, as shown, comprises a slotted valve plate 49 which is slidable in a slot 73 formed in an extension 74 of the cover plate. Pins 50 carried by the extension pass through slots 75 in the valve plate to limit its movement and a handle 51 is provided on one end of the valve plate projecting beyond the extension for moving it into either open or closed position. The valve plate has passage ways 52 and 53, the passage 52 establishing communication between the suction inlet 21 and the suction passage 22, and the passage way 53 establishing communication between the branch passage 28 and the piston chamber on the left side of the vane. The cover plate 23 is provided with an up-raised housing portion 55 having open communication with the interior of the chamber and is provided with a port 56 which may be placed in communication with the passage ways 52 and 53 in the valve plate 49. When the valve plate is in the position shown in Fig. 4, it is open and communication is established between the suction intake 21 and the suction passage 22, through the passage way 52 of the valve, and communication is established between the branch suction passage 28 and the interior of the housing 55, through the port 56 and the passage way 53 of the valve. When the stop valve is moved to closed position, communication is broken between the suction intake 21 and the suction passage way 22 and communication is also broken between the branch passage 28 and the interior of the housing 55, but it will be seen that communication is established between the port 56 of the housing 55 and the suction intake 21 through the passage way 52 of the valve. It will appear, then, that when the stop valve is moved to closed position, the only suction connection to the piston chamber is between the suction intake 21 and the housing 55 on the left side of the piston. This suction on the one side of the piston tends to allow it to be moved from the position "A", or one extremity of its working stroke, to position "C" shown in Fig. 2. The piston is provided with a flexible flap member 57 having a valve member 76 and a reinforcing element 77 fixed thereto, the valve member being engageable with the open end of the housing 55 whereby the suction communication will be cut off from the interior of the chamber from the suction intake 21 and the piston will cease oscillating but will be held by suction in such position during operation of the vehicle engine.

To permit the piston to move from position "A" or one limit of its working stroke to position "C" or its position of rest, the shoulder or contacting portion 61 of the plate 46 is yieldably mounted thereon and, as shown, comprises a bell crank lever 58 which is pivoted at 59 to the plate 46 and has a finger 61 adapted to contact the projection 47 on the valve actuating mechanism. The plate 46 is recessed, as at 62, to allow the finger 61 on the lever 58 to be depressed beyond the surface of the plate. A tension spring 63 is interposed between the plate 46 and one arm of the bell crank lever 58 to yieldably urge the projecting finger 61 upwardly, and may be secured to these members by any suitable means. It will be seen that the shaft 16 forms a stop which limits the movement of the bell crank 58.

It may be here pointed out that the tension of the spring 63 is such that it is strong enough to resist movement of the finger 61 when it contacts the portion 47 of the valve actuating mechanism to tilt the same from the right to the left, but when the arm 41 of the actuating member 39 contacts the extended portion 38 of the rocker 34, the valve actuating mechanism will have reached the limit of its movement to the left and if the stop valve 49 is in closed position, the piston will continue to move from the position "A" to position "C" as previously pointed out, carrying with it the rock shaft 16 and the plate 46 so that the finger 61 will be depressed into the recess 62 thus forming a lost motion connection between the piston and the valve actuating mechanism.

The operation of the device is as follows:

When the control valve 49 is moved to the position shown in Fig. 4, which is the open position, communication will be established from the suction intake 21 through the passage way 52 of the valve to the suction passage 22. The valve 32 being in closed position, the suction travel will be through the connecting passage way 25 to the valve chamber 26 and through the passage 24 to port 29 whereby suction will be communicated to the casing on the right side of the piston and the piston will be forced under atmospheric pressure to move to the right and take position "B" as seen in Fig. 2. As the piston takes position "B" the rock shaft and the actuating plate 46 will have been oscillated to a point where the shoulder 48 of the plate 46 will contact the projection 47 of the valve actuating member 39 to move the valve actuating mechanism, thus tilting the rocker arm 34 to thereby reverse the position of the valves and in which position the valve 31 is closed and the valve 32 will be open. As the valve 31 closes, communication is cut off between suction passage 25 and the port 29 to the right side of the piston, but a suction communication is established between the suction passage 22 and the branch passage 28 through valve chamber 27 and the passage way 53 of the stop valve 49 to port 56 in the housing 55 whereby suction is established in the casing on the left side of the piston. When suction is thus established, the piston will be moved from position "B" to position "A" at which time the plate 46 will be moved to the position shown in Fig. 3 and in which position the finger 61 of the bell crank lever 58 will contact the projection 47 to tilt the valve actuating mechanism to the position shown in Fig. 3 whereby the position of the valves is again reversed and suction is again established on the right side of the piston and cut off from the left side thereof. As pointed out, the spring 63 is of sufficient strength to resist any movement of the bell crank lever 58 when the projection 61 strikes the valve actuating mechanism.

As the piston oscillates between the positions "A" and "B" the wiper blade will be moved in an arc over the surface of the windshield which arc is, as shown in Fig. 1, substantially between points "E" and "D".

In accordance with the invention, when the windshield cleaner is inoperative, the wiper blade will be moved to a position outside of its normal wiping area and completely out of the driver's range of vision. This result is accomplished in the following manner: When the stop valve 49 is moved to closed position, communication is established between the suction intake 21 and the port 56 of the housing 55 and to the left side of the piston only, whereby the piston will be forced to move from position "A" which is one extreme limit of its working stroke to position "C", its position of rest, the yieldable finger 61 permitting such movement because of the spring 63. As the piston is thus moved from position "A" to position "C" the wiper blade will be moved from position "E" of Fig. 1, which is one limit of its normal wiping stroke, to position "F" in which position it is substantially horizontal with the top of the windshield and above the upper edge thereof. It will be seen that the wiper blade is now at rest or in parked position on the header 11 in a plane substantially parallel with the horizontal center line of the casing, beyond the limits of its normal wiping area and completely out of the driver's range of vision. When it is desired to again operate the windshield cleaner, the stop valve will be opened and suction communication will be established with the interior of the casing as previously described. The piston will then move from position "C" to position "A" and will oscillate between points "A" and "B" thereby moving the wiper blade from position "F" or parking position to position "E" whereby the blade will oscillate within the limits of its normal wiping area between points "E" and "D" over the surface of the windshield.

From the foregoing it will be seen that the present invention provides a simple and efficient means for moving the wiper blade of a windshield cleaner to a point beyond its normal working arc and completely out of the driver's range of vision without decreasing the wiping area thereof.

It will also be obvious to those skilled in the art that various changes and modifications may be made in the invention herein described without departing from the spirit or scope thereof which is to be limited only by the appended claims.

Having thus described the invention, what is claimed and desired to be secured by Letters Patent is:

1. In a fluid motor having a fluid actuated piston mounted for normal movement within predetermined limits, a source of vacuum, a pair of passages leading from the source of vacuum to the faces of the piston, valve means for alternately directing the vacuum flow from one passage to the other, valve operating means actuated by the piston for actuating the valves in timed relation to the piston movements whereby the movements of the piston are maintained within the said predetermined limits, by-pass means leading from the source of vacuum to one face of the piston, means for diverting the vacuum flow from the valves to the by-pass means to move the piston to a point beyond the limits of said predetermined normal movement, and means comprising a part of the valve actuating mechanism for permitting such movement of the piston.

2. In a fluid pressure motor having a pressure chamber and a rock shaft in the chamber, an oscillatory vane mounted on the rock shaft for arcuate movement in said chamber, a vacuum connection leading to said pressure chamber, valves for alternately connecting and disconnecting the vacuum connection to the chamber on opposite sides of the vane causing the vane to oscillate, valve operating mechanism, a plate on the rock shaft for imparting movement to the valve operating mechanism in opposite directions as the vane is oscillated, and yieldable means on the plate forming a substantially unyielding contact point between the plate and the valve operating mechanism during normal operation of the motor and a yieldable connection after the motor has been stopped.

3. In a fluid pressure motor having a pressure chamber and a movable piston mounted on a rock shaft in said chamber for movement therein, a vacuum connection leading to said pressure chamber, valves for alternately connecting and disconnecting the vacuum connection to the chamber on opposite sides of the piston causing the piston to oscillate, valve operating mechanism associated to actuate the valves upon each movement of the rock shaft, and yieldable means associated with the valve operating mechanism permitting a part of the valve operating mechanism to be moved in one direction beyond the point of valve actuation.

4. In a fluid pressure motor, a piston having a normal working range, a source of vacuum, means for applying vacuum alternately to opposite sides of the piston, means for moving the piston to an extreme position beyond the limits of its working range, and means for maintaining a continuous application of vacuum on one side of the piston while the piston is beyond the limits of its working range.

5. In a fluid motor having a wiper blade, actuating means for the blade, a source of fluid supply, passages connecting the source of fluid supply with opposite sides of the actuating means, automatic means for alternately closing and opening the passages to cause oscillation of the actuating means in a predetermined range of movement, and controlled by-pass means leading from the source of fluid supply to one side of the actuating means, the opening of said by-pass allowing fluid to exert a force upon the actuating means to move it in one direction beyond the path of regular travel and retain it in such position.

6. In a fluid motor having a wiper blade actuator, means for oscillating said actuator in a predetermined range of movement, and auxiliary means for moving said actuator in one direction beyond its predetermined range of movement and for holding it in such position.

7. In a fluid motor having a wiper blade actuator, vacuum means for oscillating said actuator in a predetermined range of movement, and auxiliary means for moving said actuator in one direction beyond its predetermined range of movement and for holding it in such position.

8. In a fluid motor having a wiper blade actuator, vacuum means for oscillating said actuator in a predetermined range of movement, and auxiliary vacuum means for moving said actuator in one direction beyond its predetermined range of movement and for holding it in such position.

9. In a fluid motor having a wiper blade actuator, means for oscillating said actuator in a predetermined range of movement, auxiliary means for moving said actuator in one direction beyond its predetermined range of movement and for holding it in such position, and manually operative means for controlling said auxiliary means.

10. In a fluid motor having a wiper blade actuator, vacuum means for oscillating said actuator in a predetermined range of movement, auxiliary vacuum means for moving said actuator in one direction beyond its predetermined range of movement and for holding it in such position, and manually operable valve means controlling the association of said auxiliary vacuum means with said actuator.

11. A fluid motor comprising a casing, a shaft mounted in and projecting from the casing, a vane in the casing fixed to the shaft, a wiper arm fixed to the projecting portion of the shaft, a pipe leading to a source of vacuum, a main vacuum passage in the casing, two branch passages in the casing leading from the main passage, the first branch passage leading into one side of the casing, valve members intermediate the main and branch passages, mechanism for operating said valve members to alternately connect and disconnect the branch passages with the main passage, a slidable valve plate in the casing, a housing in the casing on the opposite side thereof from the connection with the first branch passage, a passage in the valve plate adapted to connect the second branch passage with the interior of the housing, and a passage in said valve plate adapted to connect with either the main passage or the interior of the housing, said valve plate when connected with the main passage allowing vacuum flow to opposite sides of the vane alternately and when connected with the housing disconnecting the main passage and moving the vane into parked position against the housing.

12. A fluid motor comprising a casing, a shaft mounted in and projecting from the casing, a vane in the casing fixed to the shaft, a wiper arm fixed to the projecting portion of the shaft, a pipe connected with a source of vacuum, a main vacuum passage in the casing, valve chambers in the casing connected with the main passage, a branch passage leading from each valve chamber, the first branch passage being connected with one side of the casing, valve members slidable in the valve chambers to connect or disconnect the branch passages therewith, mechanism for operating the valve members to alternately connect and disconnect the branch passages with the main passage, and a valve member in the casing, said valve member having passages therein for connecting the vacuum pipe with the main passage and the second branch passage with the casing when in one position and disconnecting the vacuum pipe from the main passage and connecting it directly with the casing when moved into another position.

JOHN M. CHRISTMAN.